US012687472B2

(12) United States Patent  
Krishnan M et al.

(10) Patent No.: US 12,687,472 B2  
(45) Date of Patent: Jul. 21, 2026

(54) TENSILE TEST FIXTURE AND ALIGNMENT TOOL FOR TESTING SOFT POLYMERIC FOAMS

(71) Applicant: GM Global Technology Operations LLC, Detroit, MI (US)

(72) Inventors: Gokula Krishnan M, Karnataka (IN); Rajamanickam VS, Karnataka (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 286 days.

(21) Appl. No.: 18/637,564

(22) Filed: Apr. 17, 2024

(65) Prior Publication Data

US 2025/0327727 A1    Oct. 23, 2025

(51) Int. Cl.  
*G01N 3/08* (2006.01)

(52) U.S. Cl.  
CPC ....... *G01N 3/08* (2013.01); *G01N 2203/0017* (2013.01); *G01N 2203/0268* (2013.01); *G01N 2203/04* (2013.01)

(58) Field of Classification Search  
CPC .. G01N 3/08; G01N 3/32; G01N 3/00; G01N 19/04; G01N 3/10; G01N 3/04; G01N 2203/0282; G01N 3/20; G01N 2203/0073; G01N 2203/028; G01N 2203/0017; G01N 2203/0023; G01N 2203/0016; G01N 2291/02827; G01N 2203/0278; G01N 2203/0019; G01N 3/02; G01N 2203/0222; G01N 3/06; G01N 33/383; G01N 3/24; G01N 2203/0226; G01N 3/14; G01N 3/34;  
(Continued)

(56) References Cited

U.S. PATENT DOCUMENTS

| | | | | |
|---|---|---|---|---|
| 10,578,528 | B2 * | 3/2020 | Schaefer | G01N 3/02 |
| 10,969,311 | B2 * | 4/2021 | Kampmann | G01N 3/04 |

(Continued)

FOREIGN PATENT DOCUMENTS

| | | | | | |
|---|---|---|---|---|---|
| CN | 209559646 | U | | 10/2019 | |
| CN | 120020524 | A | * 5/2025 | | G01L 5/00 |

(Continued)

OTHER PUBLICATIONS

German Application No. 10 2024 116 889.7 filed Jun. 15, 2024; German Office Action dated Jan. 3, 2025; 5 pages.

*Primary Examiner* — Andre J Allen  
(74) *Attorney, Agent, or Firm* — CANTOR COLBURN LLP

(57) ABSTRACT

A tensile test fixture for securing a polymeric foam test specimen is described. The tensile test fixture comprises a first gripping member including a first support surface, a first side wall and a second side wall. The first support surface, first side wall, and the second side wall form a first specimen end receiver that is receptive of a first end of the test specimen. A second gripping member includes a second support surface, a first side wall portion and a second side wall portion. The second support surface, first side wall portion, and the second side wall portion form a second specimen end receiver that is receptive of the second end of the test specimen. Neither the first specimen end receiver nor the second specimen end receiver exerts a compressive force on corresponding ones of the first end and the second end of the test specimen.

20 Claims, 6 Drawing Sheets

(58) Field of Classification Search
CPC ... G01N 2203/0005; G01N 2203/0066; G01N
29/14; G01N 33/24; G01N 2203/0623;
G01N 3/38; G01N 3/42; G01N
2203/0048; G01N 2203/027; G01N
3/066; G01N 3/12; G01N 3/36; G01N
3/18; G01N 2203/0071; G01N
2203/0296; G01N 3/56; G01N 3/40;
G01N 3/068; G01N 2203/0033; G01N
2203/0274; G01N 2203/0246; G01N
2203/0025; G01N 2203/0075; G01N
3/16; G01N 2203/0037; G01N
2203/0244; G01N 2203/0286; G01N
2203/0647; G01N 2203/0094; G01N
2203/0256; G01N 2203/0062; G01N
33/42; G01N 2203/0676; G01N
2203/0051; G01N 2203/0254; G01N
2203/0405; G01N 2203/0021; G01N
2203/0284; G01N 2203/0682; G01N
29/227; G01N 2203/0067; G01N 29/07;
G01N 2203/021; G01N 2203/0085; G01N
2203/0617; G01N 2203/0089; G01N
2203/0218; G01N 2203/0298; G01N
33/388; G01N 2203/0064; G01N 3/22;
G01N 2203/0092; G01N 2203/0208;
G01N 1/286; G01N 2203/0042; G01N
2203/005; G01N 2291/0231; G01N 3/30;
G01N 2203/0044; G01N 2203/0091;
G01N 19/08; G01N 33/365; G01N 17/00;
G01N 33/442; G01N 2203/0664; G01N
3/062; G01N 29/11; G01N 2203/0292;
G01N 2291/044; G01N 2203/0026; G01N
2203/0288; G01N 2291/2691; G01N
2203/0435; G01N 2203/024; G01N
33/386; G01N 19/02; G01N 2203/001;
G01N 3/60; G01N 2291/0258; G01N
3/303; G01N 3/565; G01N 3/28; G01N
2203/0003; G01N 2203/0087; G01N
29/12; G01N 11/00; G01N 27/72; G01N
2203/0035; G01N 29/2418; G01N
2203/0266; G01N 2203/0688; G01N
2203/0039; G01N 2203/04; G01N
27/205; G01N 2291/02854; G01N
2291/0421; G01N 2291/0422; G01N
33/36; G01N 2203/0007; G01N
2203/0055; G01N 33/367; G01N 19/00;
G01N 2203/0242; G01N 33/346; G01N
2203/0028; G01N 2203/0641; G01N
29/045; G01N 2203/0411; G01N 33/38;
G01N 2203/0224; G01N 27/20; G01N
29/2412; G01N 2203/0098; G01N
2203/0252; G01N 2203/0476; G01N
2203/0658; G01N 2291/011; G01N
33/44; G01N 27/725; G01N 29/223;
G01N 33/445; G01N 33/46; G01N
2291/02872; G01N 2203/0216; G01N
2291/2694; G01N 29/30; G01N 33/34;
G01N 2203/0008; G01N 2203/0212;
G01N 2203/0248; G01N 2291/0427;
G01N 33/15; G01N 11/14; G01N
2203/0258; G01N 2203/0494; G01N
2203/0206; G01N 2203/0268; G01N
2203/0447; G01N 2203/0082; G01N
29/043; G01N 3/48; G01N 3/62; G01N
33/20; G01N 2203/0032; G01N
2291/106; G01N 25/72; G01N 3/307;
G01N 33/0078; G01N 2291/048; G01N
33/008; G01N 9/36; G01N 2203/0214;
G01N 3/58; G01N 33/4833; G01N
2203/0053; G01N 2203/0441; G01N
2203/0635; G01N 2291/102; G01N
27/24; G01N 2203/0069; G01N
2203/0423; G01N 2203/0694; G01N
2291/015; G01N 2291/0423; G01N
2291/101; G01N 29/2475; G01N 3/26;
G01N 33/0081; G01N 17/02; G01N
2203/0452; G01N 2291/0232; G01N
11/10; G01N 11/16; G01N 17/006; G01N
19/10; G01N 2203/006; G01N
2203/0276; G01N 2203/0605; G01N
29/4427; G01N 3/064; G01N 3/317;
G01N 33/0091; G01N 21/21; G01N
2203/0041; G01N 2203/0057; G01N
2291/267; G01N 29/2437; G01N 29/46;
G01N 11/165; G01N 2291/0251; G01N
2291/2695; G01N 3/165; G01N 33/10;
G01N 13/00; G01N 15/08; G01N
2291/02881; G01N 29/348; G01N 33/02;
G01N 33/54373; G01N 11/162; G01N
2203/0076; G01N 2203/008; G01N
2203/0228; G01N 33/26; G01N 11/04;
G01N 15/0826; G01N 2203/0096; G01N
2203/0464; G01N 23/207; G01N 27/223;
G01N 33/2045; G01N 33/222; G01N
2203/0012; G01N 2291/0237; G01N
2291/0238; G01N 2291/02863; G01N
25/16; G01N 29/24; G01N 29/4418;
G01N 3/313; G01N 3/567; G01N
33/0086; G01N 35/00871; G01N
15/0806; G01N 2203/0429; G01N
2203/0482; G01N 2291/0289; G01N
29/222; G01N 29/343; G01N 3/405;
G01N 33/32; G01N 5/04; G01N 21/88;
G01N 21/95; G01N 2203/0204; G01N
2203/023; G01N 2203/0232; G01N
2203/0272; G01N 2291/014; G01N
2291/0235; G01N 2291/103; G01N
23/046; G01N 27/82; G01N 27/9046;
G01N 33/0077; G01N 33/204; G01N
15/088; G01N 21/91; G01N 2203/0264;
G01N 2203/06; G01N 2291/2623; G01N
23/20; G01N 25/00; G01N 27/041; G01N
29/42; G01N 29/4472; G01N 3/46; G01N
33/0083; G01N 33/241; G01N
2203/0234; G01N 2203/029; G01N
2203/0629; G01N 2223/419; G01N
2291/02416; G01N 2291/02466; G01N
2291/105; G01N 2291/2634; G01N
2291/2693; G01N 29/04; G01N 29/069;
G01N 29/28; G01N 33/025; G01N 1/04;
G01N 11/142; G01N 21/1702; G01N
21/8806; G01N 2203/0236; G01N
2203/0262; G01N 2291/02836; G01N
29/036; G01N 29/326; G01N 29/4436;
G01N 3/31; G01N 33/00; G01N 1/28;
G01N 1/32; G01N 21/01; G01N 21/70;
G01N 21/952; G01N 2203/0238; G01N
2203/0652; G01N 2291/02491; G01N
27/90; G01N 29/022; G01N 29/4445;
G01N 33/0003; G01N 33/12; G01N 2001/021; G01N 2013/0216; G01N
2021/8472; G01N 21/1717; G01N
21/8422; G01N 2203/026; G01N
2203/047; G01N 2291/265; G01N
2291/2675; G01N 2291/269; G01N
27/22; G01N 29/024; G01N 29/041;
G01N 29/048; G01N 29/22; G01N
29/228; G01N 29/245; G01N 29/262;
G01N 29/4463; G01N 29/449; G01N
3/52; G01N 33/48; G01N 33/54346;
G01N 5/00; G01N 5/02; G01N 11/02;
G01N 17/043; G01N 21/64; G01N
2203/0202; G01N 2291/02441; G01N
2291/0256; G01N 2291/02818; G01N
27/04; G01N 27/902; G01N 27/904;
G01N 27/9053; G01N 29/09; G01N
29/221; G01N 29/36; G01N 33/0096;
G01N 7/10; G01N 13/02; G01N 15/02;
G01N 15/082; G01N 17/002; G01N
17/046; G01N 2001/2873; G01N
2015/0096; G01N 2015/0846; G01N
2035/00881; G01N 21/211; G01N 21/31;
G01N 21/954; G01N 2203/003; G01N
2203/025; G01N 2291/0428; G01N
2291/2626; G01N 2291/2636; G01N
2291/2672; G01N 23/2251; G01N
29/0672; G01N 29/2481; G01N 29/4454;
G01N 29/48; G01N 29/50; G01N
33/2022; G01N 35/028; G01N 35/04;
G01N 9/00; G01N 9/02; G01N 15/00;
G01N 17/04; G01N 2001/025; G01N
2011/0033; G01N 2015/0873; G01N
2015/1006; G01N 2015/1495; G01N
2015/1497; G01N 2021/1725; G01N
21/171; G01N 21/43; G01N 21/7703;
G01N 21/9501; G01N 21/958; G01N
2201/0233; G01N 2203/0078; G01N
2203/0458; G01N 2291/0234; G01N
2291/0255; G01N 23/083; G01N 25/04;
G01N 25/20; G01N 27/048; G01N
27/121; G01N 27/225; G01N 27/9006;
G01N 29/00; G01N 29/02; G01N 29/032;
G01N 29/0681; G01N 29/075; G01N
29/225; G01N 29/265; G01N 29/323;
G01N 3/44; G01N 3/50; G01N 33/0095;
G01N 33/04; G01N 33/2823; G01N
33/30; G01N 33/447; G01N 33/487;
G01N 33/49; G01N 33/4905; G01N
35/0099; G01N 1/2226; G01N 1/24;
G01N 1/2813; G01N 11/08; G01N 19/06;
G01N 2001/2866; G01N 2001/366; G01N
2011/0026; G01N 2013/006; G01N
2015/0092; G01N 2035/00772; G01N
2035/0441; G01N 21/0303; G01N 21/15;
G01N 21/25; G01N 21/27; G01N 21/47;
G01N 21/8915; G01N 2201/06113; G01N
2203/0417; G01N 2203/0611; G01N
2203/067; G01N 2291/0226; G01N
2291/02845; G01N 2291/0426; G01N
2291/056; G01N 2291/2632; G01N
2291/2698; G01N 23/203; G01N 25/02;
G01N 25/18; G01N 25/4866; G01N
27/02; G01N 27/023; G01N 27/026;
G01N 27/12; G01N 29/06; G01N
29/0609; G01N 29/2462; G01N 29/38;

G01N 29/4409; G01N 31/22; G01N
33/009; G01N 33/40; G01N 33/48735;
G01N 35/025; G01N 9/24; G01N 1/00;
G01N 1/02; G01N 1/08; G01N 1/18;
G01N 1/2035; G01N 1/22; G01N 1/2202;
G01N 15/06; G01N 15/10; G01N
15/1031; G01N 15/1425; G01N 15/1433;
G01N 15/1456; G01N 15/1468; G01N
15/147; G01N 2001/022; G01N
2001/028; G01N 2001/2223; G01N
2001/388; G01N 2011/0086; G01N
2013/0225; G01N 2013/0233; G01N
2015/0038; G01N 2021/036; G01N
2021/0389; G01N 2021/1706; G01N
2021/1708; G01N 2021/1787; G01N
2021/3595; G01N 2021/5969; G01N
2021/646; G01N 2021/7786; G01N
2021/7796; G01N 2021/8427; G01N
2021/8438; G01N 2021/8444; G01N
2021/8822; G01N 2021/8829; G01N
2021/8838; G01N 2021/8874; G01N
2021/8887; G01N 2035/00336; G01N
2035/00683; G01N 2035/00782; G01N
2035/00841; G01N 2035/00851; G01N
21/17; G01N 21/23; G01N 21/251; G01N
21/255; G01N 21/33; G01N 21/3581;
G01N 21/45; G01N 21/453; G01N 21/57;
G01N 21/636; G01N 21/6428; G01N
21/714; G01N 21/78; G01N 21/84; G01N
21/8483; G01N 21/8803; G01N 21/8851;
G01N 21/93; G01N 21/9503; G01N
21/9505; G01N 21/956; G01N 21/95684;
G01N 22/02; G01N 22/04; G01N
2201/102; G01N 2201/13; G01N
2203/00; G01N 2203/022; G01N
2223/053; G01N 2223/09; G01N
2223/6116; G01N 2223/616; G01N
2291/018; G01N 2291/0224; G01N
2291/02408; G01N 2291/02433; G01N
2291/0245; G01N 2291/025; G01N
2291/104; G01N 2291/2638; G01N
2291/2696; G01N 23/04; G01N 23/06;
G01N 23/18; G01N 25/4846; G01N
27/002; G01N 27/07; G01N 27/126;
G01N 27/18; G01N 27/221; G01N
27/226; G01N 27/227; G01N 27/228;
G01N 27/4067; G01N 27/4071; G01N
27/4073; G01N 27/4145; G01N 27/42;
G01N 27/44743; G01N 27/44773; G01N
27/62; G01N 27/74; G01N 27/83; G01N
27/84; G01N 27/85; G01N 27/9013;
G01N 29/0645; G01N 29/0663; G01N
29/2406; G01N 29/2425; G01N 29/2456;
G01N 29/34; G01N 29/346; G01N 29/40;
G01N 29/4481; G01N 29/52; G01N 3/54;
G01N 31/221; G01N 33/0009; G01N
33/0027; G01N 33/0085; G01N 33/0098;
G01N 33/08; G01N 33/205; G01N
33/208; G01N 33/246; G01N 33/362;
G01N 33/54353; G01N 33/54366; G01N
33/569; G01N 35/00; G01N 35/00712;
G01N 35/0098; G01N 35/02; G01N
5/025; G01N 7/00; G01N 9/04; G01N
9/08; G01N 9/10; G01N 9/12; G01N
9/20; G01N 1/2806; G01N 1/38; G01N

1/4022; G01N 1/42; G01N 1/44; G01N
13/04; G01N 15/01; G01N 15/04; G01N
2001/386; G01N 2001/4033; G01N
2013/0283; G01N 2015/1022; G01N
2021/1704; G01N 2021/213; G01N
2021/4166; G01N 2021/434; G01N
2021/9518; G01N 2035/00188; G01N
2035/00198; G01N 2035/00217; G01N
21/00; G01N 21/0317; G01N 21/41;
G01N 21/4133; G01N 2203/0058; G01N
2203/0083; G01N 2223/04; G01N
2223/056; G01N 2223/1016; G01N
2223/108; G01N 2223/309; G01N
2223/311; G01N 2223/321; G01N
2223/418; G01N 2223/607; G01N
2223/62; G01N 2223/632; G01N
2223/646; G01N 2223/649; G01N
2291/0254; G01N 2291/043; G01N
2291/2697; G01N 23/02; G01N 23/201;
G01N 25/12; G01N 25/68; G01N 27/00;
G01N 27/127; G01N 29/0618; G01N
29/2431; G01N 29/2487; G01N 29/44;
G01N 33/0006; G01N 33/0093; G01N
33/1873; G01N 33/207; G01N 33/22;
G01N 33/245; G01N 33/2841; G01N
33/39; G01N 33/575; G01N 35/00594;
G01N 35/00603; G01N 5/045

USPC ..................................................... 73/760–833
See application file for complete search history.

(56) References Cited

U.S. PATENT DOCUMENTS

| | | | | |
|---|---|---|---|---|
| 2022/0178801 | A1* | 6/2022 | Freitag | G01N 3/08 |
| 2023/0075936 | A1* | 3/2023 | Coward | G01N 3/08 |
| 2024/0175793 | A1* | 5/2024 | Hollander | G01N 3/02 |
| 2025/0369848 | A1* | 12/2025 | Salerno | G01N 3/10 |

FOREIGN PATENT DOCUMENTS

| | | | | | |
|---|---|---|---|---|---|
| DE | 3820935 | A1 | 12/1989 | | |
| JP | 2022151270 | A | * 10/2022 | | |
| KR | 102171668 | B1 | * 10/2020 | | G01N 1/36 |
| KR | 20220161061 | A | * 12/2022 | | G01N 3/04 |

* cited by examiner

TENSILE TEST FIXTURE AND ALIGNMENT TOOL FOR TESTING SOFT POLYMERIC FOAMS

The subject disclosure relates to the art of materials testing and, more particularly, to a tensile test fixture and alignment tool for testing soft polymeric foams.

Scientists and engineers are ever testing the suitability of various materials to perform a specific function or serve in a particular role. Testing may include compression tests, shear tests, tensile tests and the like. In a tensile test, a specimen is prepared and affixed in a testing device. The testing device holds opposing ends of the specimen and a pulling force is applied. The pulling force is increased until the specimen fails. The force at which the specimen failed is then record, studied, and compared with other materials.

Specimens are either held in gripping jaws or connected through a threaded interface. While retaining harder materials, such as metals, hard plastics, composites, and the like is a routine matter, clamping softer materials, such as foams, in gripping jaws is more challenging. Clamping soft and/or pliable foams can impose changes on intrinsic mechanical properties of the material including a response to tensile forces. Accordingly, it is desirable to provide a system for retaining soft foams for tensile testing without affecting material properties of the test specimen.

SUMMARY

In one exemplary embodiment a tensile test fixture for securing a polymeric foam test specimen having a first end, a second end opposite the first end, and a dog bone region extending between the first end and the second end is described. The tensile test fixture comprises a first gripping member including a first support surface, a first side wall and a second side wall. The first support surface, first side wall, and the second side wall form a first specimen end receiver that is receptive of the first end of the polymeric foam test specimen. A second gripping member includes a second support surface, a first side wall portion and a second side wall portion. The second support surface, first side wall portion, and the second side wall portion form a second specimen end receiver that is receptive of the second end of the polymeric foam test specimen. Neither the first specimen end receiver nor the second specimen end receiver exerts a compressive force on corresponding ones of the first end and the second end.

In addition to one or more of the features described herein, the tensile test fixture further comprises a first adaptor coupled to the first support surface and a second adaptor coupled to the second support surface. The first adaptor and the second adaptor are configured to establish an interface between corresponding ones of the first gripping member and the second gripping member and a test apparatus.

In addition to one or more of the features described herein, the tensile test fixture according to claim 2, wherein the first adaptor includes a first pin that extends through the first support surface and a first socket.

In addition to one or more of the features described herein, the tensile test fixture further comprises a first pin fastener that extends through the first side wall, the second side wall, and the first pin.

In addition to one or more of the features described herein, the tensile test fixture according to claim 3, further comprising a first locknut connected to the first socket and a second locknut connected to the second socket, the first locknut including a first plurality of threads and the second locknut including a second plurality of threads.

In addition to one or more of the features described herein, the tensile test fixture according further comprises a first end interface including a first plurality of side walls that defines a first end cup that is configured to be adhesively bonded to the first end of the polymeric foam test specimen and a second end interface including a second plurality of side walls that defines a second end cup that is configured to be adhesively bonded to the second end of the polymeric foam test specimen.

In addition to one or more of the features described herein, the tensile test fixture first side wall includes a first end coupled to the first support surface and a second end, and the second side wall includes a first end section coupled to the first support surface and a second end section. The first end includes a first flange that extends toward the second side wall and the second end section includes a second flange extending toward the first side wall. The first flange and the second flange secure the first end interface in the first specimen end receiver.

In addition to one or more of the features described herein, The tensile test fixture according to claim 7, further comprising a first alignment member extending along one of the first flange and the second flange and between the first side wall and the second side wall, the first alignment member establishing an orientation of the first end member relative to the first gripping member.

In addition to one or more of the features described herein, the test fixture further comprises an alignment fixture including a first member, a second member spaced from the first member, and a connecting member joining the first member and the second member. The first gripping member and the second gripping member are arranged between the first member and the second member, and the alignment fixture orients the first end interface relative to the second end interface.

In addition to one or more of the features described herein, the test fixture further comprising a first dowel and a second dowel extending through the first member and the second member adjacent the first end interface and a first dowel element and a second dowel element extending through the first member and the second member adjacent the second end interface. The dog bone region passes between the first dowel and the second dowel and the first dowel element and the second dowel element.

In another exemplary embodiment a method of supporting a polymeric foam test specimen having a first end, a second end opposite the first end, and a dog bone region extending between the first end and the second end in a tensile test fixture comprises positioning the first end of the polymeric foam test specimen in a first gripping member that does not exert a compressive force on the first end and positioning the first end of the polymeric foam test specimen in a first gripping member that does not exert a compressive force on the second end.

In addition to one or more of the features described herein, the method further comprises bonding a first end interface to the first end of the polymeric foam test specimen and bonding a second end interface to the second end of the polymeric foam test specimen.

In addition to one or more of the features described herein, bonding of the first end of the polymeric foam test specimen to the first end interface and bonding the second end of the polymeric foam test specimen to the second end interface includes applying an amount of adhesive to one of the first end of the polymeric foam test specimen and the first and interface and one of the second end of the polymeric foam test specimen and the second end interface.

In addition to one or more of the features described herein, positioning the first end of the polymeric foam test specimen in the gripping member includes sliding the first end interface into a first specimen end receiver defined between a first support surface, a first side wall and a second side wall and positioning the second end of the polymeric foam test specimen in the second gripping member includes sliding the second end interface into a second specimen end receiver defined between a second support surface, a first side wall portion, and a second side wall portion.

In addition to one or more of the features described herein, the method further comprises restraining the first end of the polymeric foam test specimen in the first specimen end receiver between the first support surface and, a first flange extending from the first side wall and a second flange extending from the second side wall towards the first flange and restraining the second end of the polymeric foam test specimen in the second specimen end receiver between the second support surface and a first flange member extending from the first side wall portion and a second flange member extending from the second side wall portion toward the first flange member.

In addition to one or more of the features described herein, restraining the first end of the polymeric foam test specimen includes trapping the first end interface between the first support surface, the first flange, and the second flange and restraining the second end of the polymeric foam test specimen includes trapping the second end interface between the second support surface, the first flange member, and the second flange member.

In addition to one or more of the features described herein the method further comprises aligning the first end of the polymeric foam test specimen relative to the first gripping member and aligning the second end of the polymeric foam test specimen relative to the second gripping member.

In addition to one or more of the features described herein, wherein aligning the first end of the polymeric foam test specimen includes securing a first alignment member along one of the first flange and the second flange and between the first side wall and the second side wall and wherein aligning the second end of the polymeric foam test specimen includes securing a second alignment member along one of the first flange member and the second flange member between the first side wall portion and the second side wall portion.

In addition to one or more of the features described herein the method further comprises aligning the first end of the polymeric foam test specimen in the first specimen end receiver relative to the second end of the polymeric foam test specimen in the second specimen end receiver.

In addition to one or more of the features described herein, aligning the first end of the polymeric foam test specimen with the second end of the polymeric foam test specimen includes positioning the first end interface and the second end interface between a first member and a second member of an alignment fixture.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figures 1, 2:
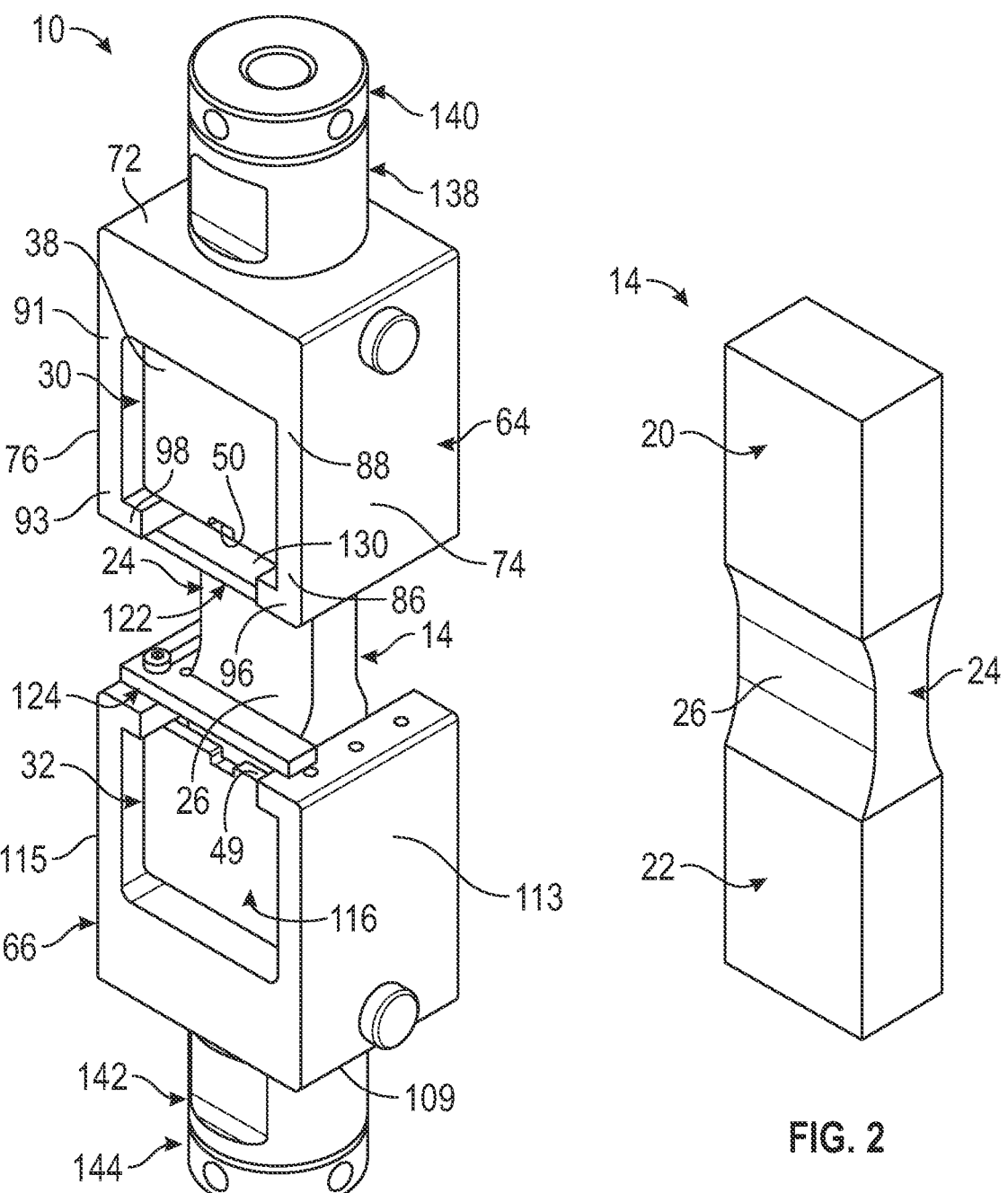
FIG. 1 is a perspective view of a polymeric foam test specimen supported in a tensile test fixture, in accordance with a non-limiting example.
FIG. 2 is a perspective view of the polymeric foam test specimen of FIG. 1, in accordance with a non-limiting example.

The following description is merely exemplary in nature and is not intended to limit the present disclosure, its application or uses. It should be understood that throughout the drawings, corresponding reference numerals indicate like or corresponding parts and features.

A tensile test fixture 10 for supporting a polymeric foam test specimens 14 in a tensile test apparatus (not shown) is illustrated in FIG. 1. As shown in FIG. 2, polymeric foam test specimen 14 includes a first end 20, a second end 22 that is opposite first end 20, and an intermediate portion 24. Intermediate portion 24 defines a dog bone region 26. First end 20 and second end 22, as will be detailed more fully herein, are gripped/retained by tensile test fixture 10 without imparting any compressive force to polymeric foam test specimen 14. Polymeric foam test specimen 14 may then be subjected to a tensile force for testing purposes.

Figures 3, 4, 5:
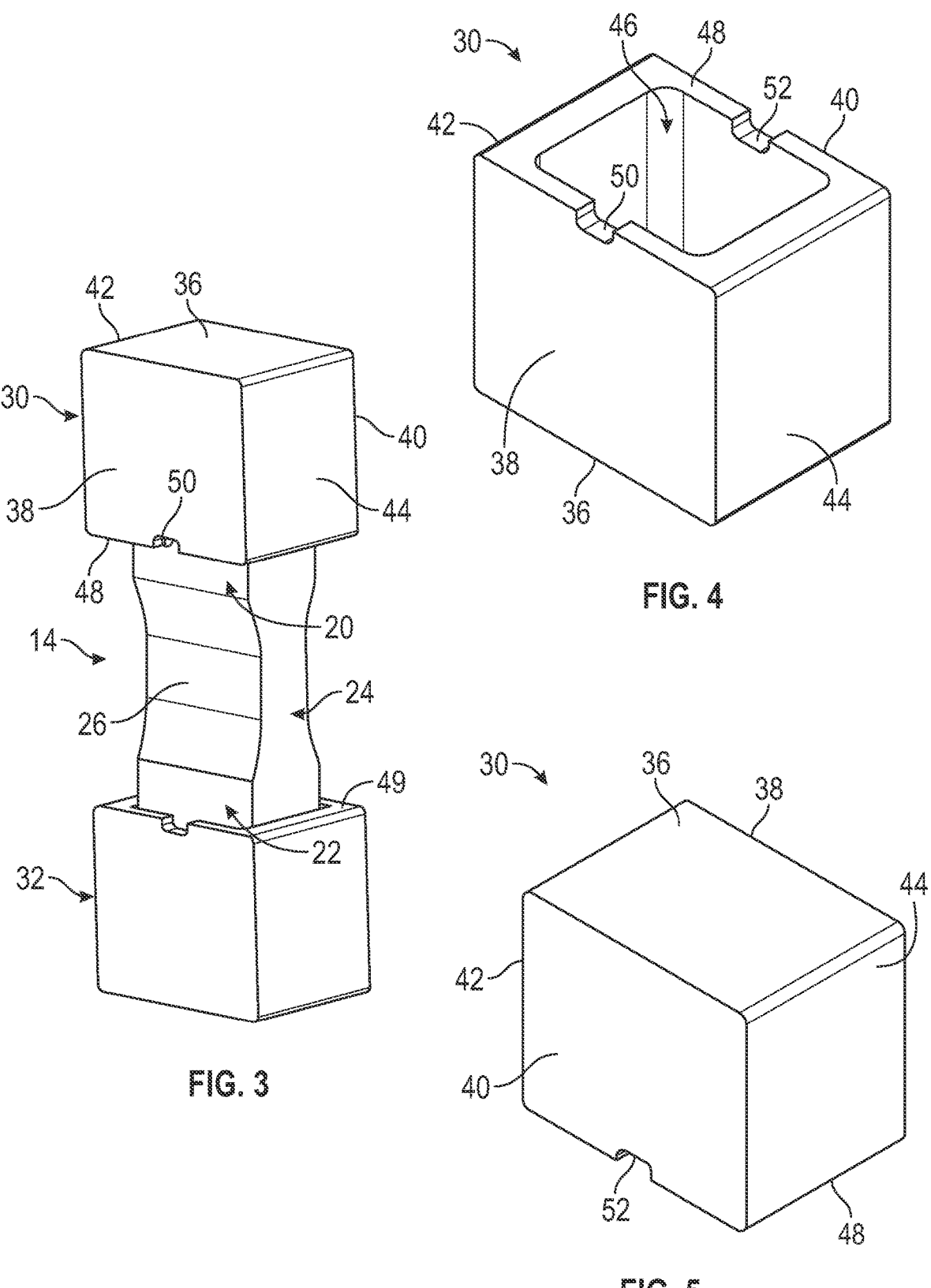
FIG. 3 is a perspective view of a first polymeric foam test specimen end interface bonded to a first end of the polymeric foam test specimen of FIG. 2 and a second polymeric foam test specimen end interface bonded to a second end of the polymeric foam test specimen of FIG. 2, in accordance with a non-limiting example.
FIG. 4 is a perspective view of a first side of the first polymeric foam test specimen end interface of FIG. 3, in accordance with a non-limiting example.
FIG. 5 is a perspective view of a second side of the first polymeric foam test specimen end interface of FIG. 4, in accordance with a non-limiting example.

Referring to FIG. 3, and with continued reference to FIGS. 1 and 2, a first end interface 30 is bonded to first end 20 of polymeric foam test specimen 14 and a second end interface 32 is bonded to second end 22 of polymeric foam test specimen 14. Reference will now follow to FIG. 4 and FIG. 5 in describing first end interface 30 with an understanding that second end interface 32 includes corresponding structure.

First end interface 30 includes a base surface 36, a first side surface 38, a second side surface 40 that is opposite first side surface 38, a third side surface 42 and a fourth side surface 44 that is opposite third side surface 42. Third side surface 42 and fourth side surface 44 extend between and connect with first side surface 38 and second side surface 40. Base surface 36, first side surface 38, second side surface 40, third side surface 42, and fourth side surface 44 collectively define a cavity 46 that is receptive of first end 20 of polymeric foam test specimen 14.

First side surface 38, second side surface 40, third side surface 42, and fourth side surface 44 create a peripheral edge 48 that circumscribes and defines an opening (not separately labeled) providing access to cavity 46. Peripheral edge 48 includes a first notch 50 and a second notch 52. First notch 50 is associated with first side surface 38 and second notch 52 is associated with second side surface 40. First notch 50 and second notch 52, as will be detailed more fully herein, facilitate alignment of first end interface 30 relative to second end interface 32. First end interface 30 may be bonded to the first end 20 of polymeric foam test specimen 14. For example, an amount of adhesive may be provided in cavity 46 after inserting first end 20 inside the cavity 46 in order to create the bond when the parts are joined.

In a non-limiting example, peripheral edge 48 defines a gripping surface (not separately labeled) for first end 20 of polymeric foam test specimen 14. As will be detailed more fully herein, tensile force is applied to polymeric foam test specimen 14 through peripheral edge 48 of first end interface 30 and the peripheral edge 49 of second end interface 32. In this manner, polymeric foam test specimen 14 may be exposed to tensile forces without also experiencing clamping forces that could skew test results. Thus, as shown in FIG. 1, once bonded to first end interface 30 and second end interface 32, first end 20 is supported in a first gripping member 64 and second end 22 is supported in a second gripping member 66.

Figures 6, 7:
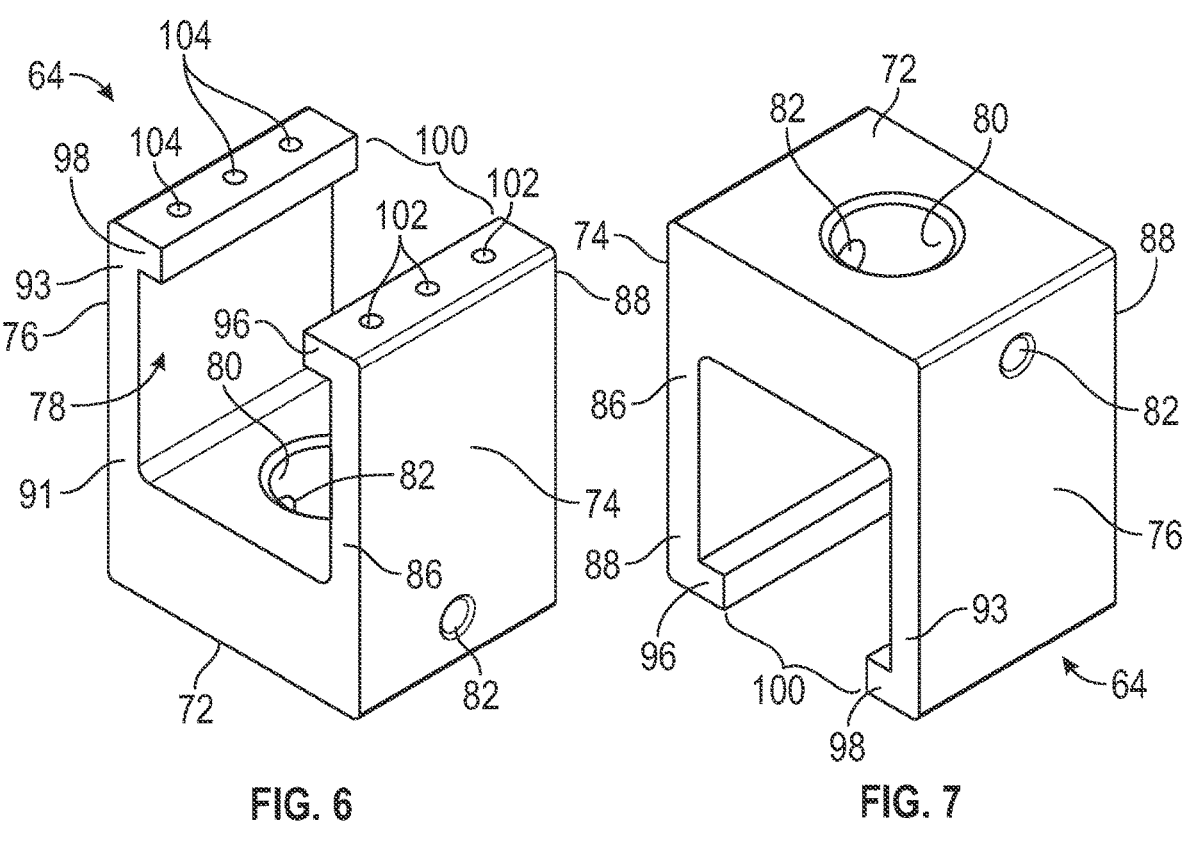
FIG. 6 is a perspective view of a first side portion of a gripping member for the tensile test fixture of FIG. 1, in accordance with a non-limiting example.
FIG. 7 is a perspective view of a second side portion of the gripping member of FIG. 6, in accordance with a non-limiting example.

As shown in FIG. 6 and FIG. 7 first gripping member 64 includes a first support surface 72, a first side wall 74, and a second side wall 76. First side wall 74 and second side wall 76 are arranged opposite to one another and extend from first support surface 72. First support surface 72, first side wall 74, and second side wall 76 define a first specimen end receiver 78. First support surface 72 includes an opening 80. A passage 82 extends through first side wall 74 and second side wall 76. Passage 82 bisects opening 80.

In a non-limiting example, first side wall 74 includes a first end 86 and a second end 88. First end 86 is formed with first support surface 72. Second end 88 is cantilevered from first support surface 72. Similarly, second side wall 76 includes a first end section 91 and a second end section 93. First end section 91 is formed with first support surface 72 and second end section 93 is cantilevered from first support surface 72. A first flange 96 is provided on second end 88 of first side wall 74. A second flange 98 is provided on second end section 93 of second side wall 76. First flange 96 extends toward second side wall 76 and second flange 98 extends towards first side wall 74. A gap 100 is maintained between first flange 96 and second flange 98. Gap 100 is sized so as to accommodate dog bone region 26 of polymeric foam test specimen 14.

In a non-limiting example, first flange 96 includes a first plurality of openings 102 and second flange 98 includes a second plurality of openings 104. First plurality of openings 102 and/or second plurality of openings 104 accommodate an alignment system as will be detailed more fully herein. At this point, it should be understood that second gripping member 66 includes similar structure. For example, as shown in FIG. 1, second gripping member 66 includes a second support surface 109, a first side wall portion 113 and a second side wall portion 115 that collectively define a second specimen end receiver 116. In a non-limiting example, first end 20 of polymeric foam test specimen 14 is inserted into first specimen end receiver 78 and second end 22 is inserted into second specimen end receiver 116. At first end 20, first flange 96 and second flange 98 engage peripheral edge 48. Second end 22 is retained in a similar manner.

Figure 8:
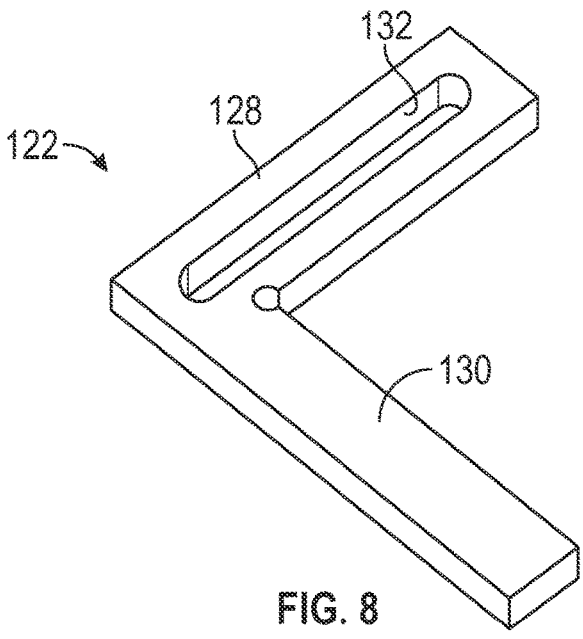
FIG. 8 is a perspective view of an alignment member of the tensile test fixture depicted in FIG. 1, in accordance with a non-limiting example.

Before mounting polymeric foam test specimen 14 in test fixture 10 as shown in FIG. 1, a first alignment member 122 is mounted to first gripping member 64 and second alignment member 124 is mounted to second gripping member 66. First alignment member 122 and second alignment member 124 maintain a selected relative alignment of first end 20 and second end 22 relative to corresponding ones of first gripping member 64 and second gripping member 66 to ensure that dog bone region 26 is not twisted. Reference will now follow to FIG. 8 in describing first alignment member 122 with the understanding that second alignment member 124 includes similar structure.

In a non-limiting example, first alignment member 122 includes a first side or leg 128 and a second side or leg 130 forming a generally L-Shaped member. First leg 128 includes a slot 132. In the non-limiting example shown, first leg 128 extends along and is connected to first flange 96 through one or more fasteners 134 that extend through slot 132 and engage with first flange 96 through one of the plurality of openings 102 and second leg 130 extends across gap 100 and rests on second flange 98. Second leg 130 also engages first end 20 of polymeric foam test specimen 14. In this manner, alignment member 122 establish a desired alignment of first end 20 relative to first gripping member 64.

Figure 9:
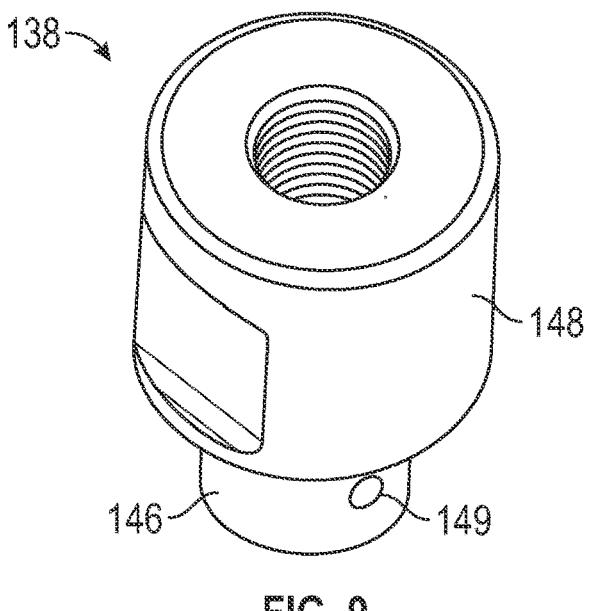
FIG. 9 is a perspective view of an end adaptor of the tensile test fixture of FIG. 1, in accordance with a non-limiting example.
Figure 10:
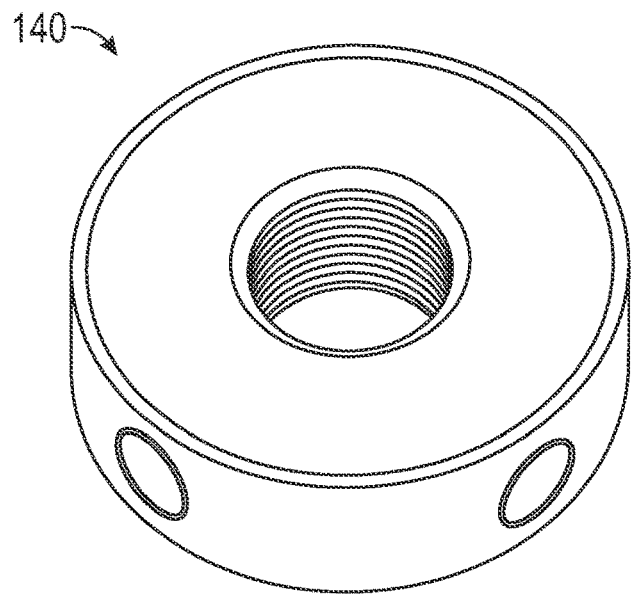
FIG. 10 is a perspective view of a locknut associated with the end adaptor of FIG. 9, in accordance with a non-limiting example.
Figure 11:
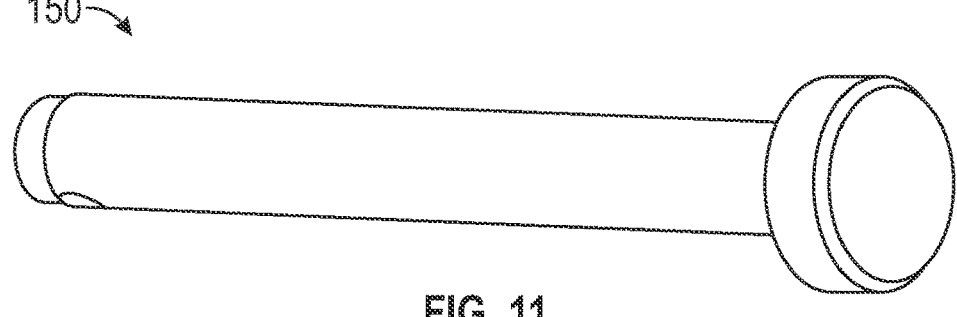
FIG. 11 is a perspective view of a dowel pin that secures the end adaptor of FIG. 9 to the gripping member of FIG. 6, in accordance with a non-limiting example.

In a non-limiting example, in addition to interfacing with polymeric foam test specimen 14, first gripping member 64 and second gripping member 66 must also interface with a test machine (not shown). Toward that end, a first adaptor 138 and a first locknut 140 are connected to first gripping member 64 and a second adaptor 142 and a second locknut 144 are connected to second gripping member 66 as shown in FIG. 1. Reference will now follow to FIG. 9 and FIG. 10 in describing first adaptor 138 and first locknut 140 with an understanding that second adaptor 142 and second locknut 144 include similar structure. First adaptor 138 includes a first pin 146 that extends through opening 80 in first gripping member 64 and a first socket 148 that is threaded. First pin 146 includes a first passage portion 149. First socket 148 serves as an interface with the testing machine. First locknut 140 secures first adaptor 138 to the testing machine so as to avoid twisting. A first lock pin 150, FIG. 11, extends through passage 82 and first pin 146 via passage portion 149 to secure adaptor to first gripping member 64.

Figure 12:
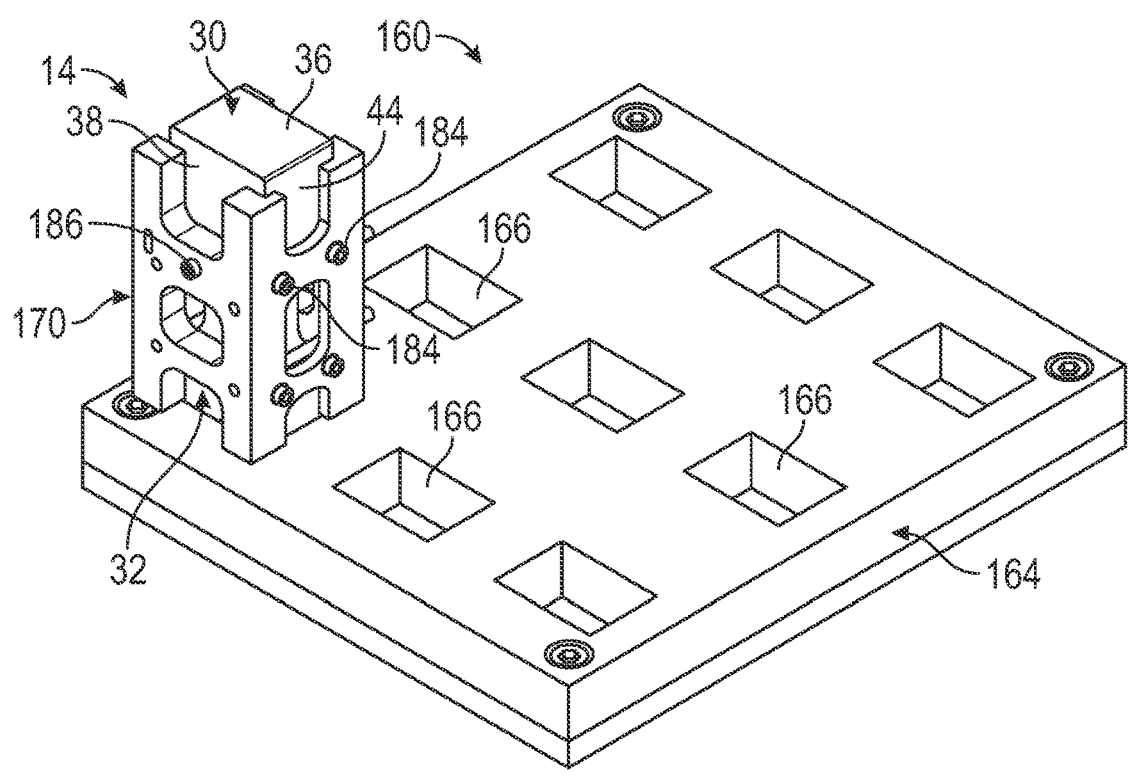
FIG. 12 is a perspective view of the polymeric foam test specimen of FIG. 3 in a polymeric foam test specimen alignment fixture sitting in a mounting plate, in accordance with a non-limiting example.

In addition to maintaining a desired alignment between first end 20 and second end 22 relative to corresponding ones of first gripping member 64 and second gripping member 66 it is also desirable to align first end 20 with second end 22. Toward that end, after bonding first end interface 30 to first end 20 and second end interface 32 to second end 22, and while the adhesive is curing, polymeric foam test specimen 14 is inserted into an alignment system 160 including a mounting plate 164 as shown in FIG. 12. First end 20 encased by first end interface 30 is inserted into one of a plurality of openings 166 formed in mounting plate 164. An alignment fixture 170 is then positioned about polymeric foam test specimen 14. Polymeric foam test specimen 14 is then secured in alignment fixture 170 to establish and end-to-end alignment.

Figure 13:
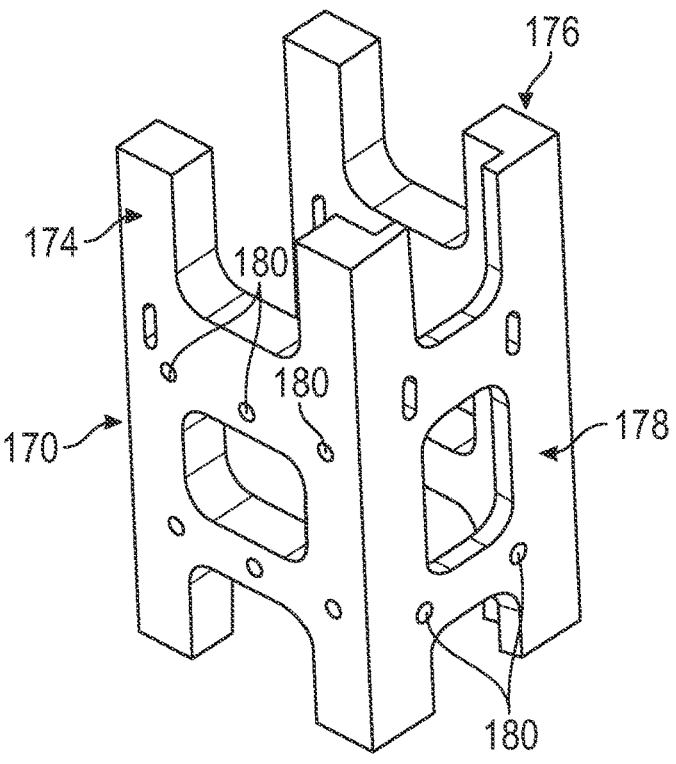
FIG. 13 is a perspective view of a first side of the polymeric foam alignment fixture of FIG. 12, in accordance with a non-limiting example.
Figure 14:
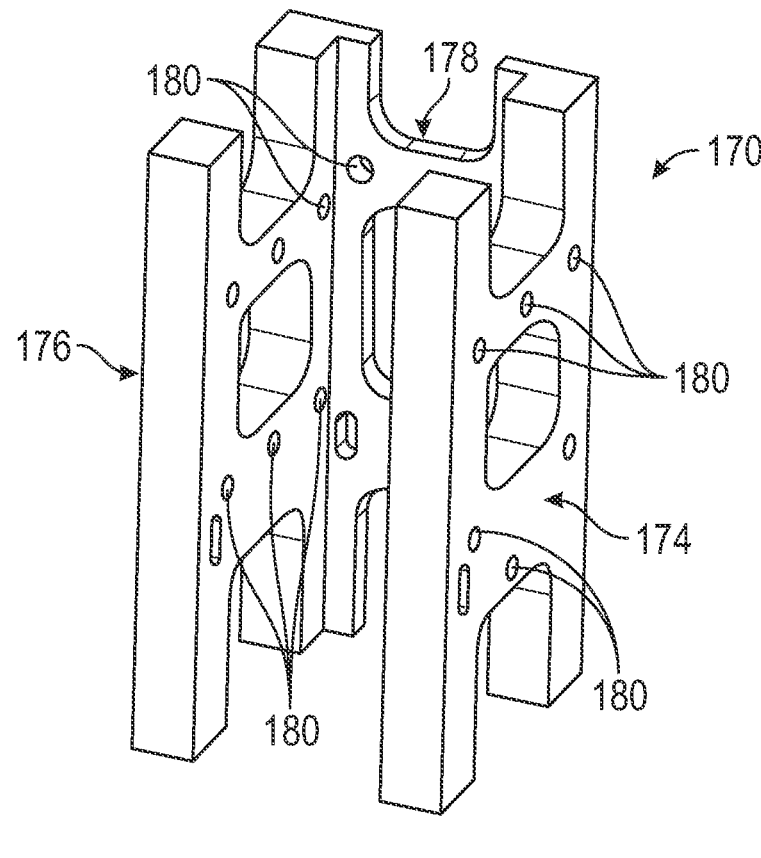
FIG. 14 is a perspective view of a second side of the polymeric foam alignment fixture, in accordance with a non-limiting example.
Figure 15:
FIG. 15 is a perspective view of a dowel pin used to secure the polymeric foam test specimen in the polymeric foam alignment fixture of FIG. 13, in accordance with a non-limiting example.

Alignment fixture 170, as shown in FIGS. 13 and 14, includes a first member 174, a second member 176, and a connecting member 178. First member 174, second member 176, and connecting member 178 surround and encapsulate, on three sides, polymeric foam test specimen 14. First member, 174, second member 176, and connecting member 178 include a plurality of openings or passages 180. Passages 180 in first member 174 and passages 180 in second member 176 align with one another. Dowel pins such as shown at 184 in FIG. 15 pass through passages 180 between first member 174 and second member 176 establishing a selected position for polymeric foam test specimen 14. Locating pins 186 (FIG. 12) may pass through first member 174 and/or second member 176 and engage with first notch 50 and second notch 52 to further enhance alignment.

At this point, it should be understood, that the tensile test fixture according to the non-limiting examples described herein retains a polymeric foam test specimen without exerting any compression forces so that it may be exposed to purely tensile stresses when being tested. Thus, the test fixture facilitates more accurate and repeatable testing results for polymeric foam.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

The term "about" is intended to include the degree of error associated with measurement of the particular quantity based upon the equipment available at the time of filing the application. For example, "about" can include a range of ±8% of a given value.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A tensile test fixture for securing a polymeric foam test specimen having a first end, a second end opposite the first end, and a dog bone region extending between the first end and the second end, the tensile test fixture comprising:
   a first gripping member including a first support surface, a first side wall and a second side wall, the first support surface, first side wall, and the second side wall forming a first specimen end receiver that is receptive of the first end of the polymeric foam test specimen; and
   a second gripping member including a second support surface, a first side wall portion and a second side wall portion, the second support surface, first side wall portion, and the second side wall portion forming a second specimen end receiver that is receptive of the second end of the polymeric foam test specimen, wherein neither the first specimen end receiver nor the second specimen end receiver exert a compressive force on corresponding ones of the first end and the second end.

2. The tensile test fixture according to claim 1, further comprising a first adaptor coupled to the first support surface and a second adaptor coupled to the second support surface, the first adaptor and the second adaptor being configured to establish an interface between corresponding ones of the first gripping member and the second gripping member and a test apparatus.

3. The tensile test fixture according to claim 2, wherein the first adaptor includes a first pin that extends through the first support surface and a first socket.

4. The tensile test fixture according to claim 3, further comprising a first pin fastener that extends through the first side wall, the second side wall, and the first pin.

5. The tensile test fixture according to claim 3, further comprising a first locknut connected to the first socket and a second locknut connected to a second socket, the first locknut including a first plurality of threads and the second locknut including a second plurality of threads.

6. The tensile test fixture according to claim 1, further comprising a first end interface including a first plurality of side walls that define a first end cup that is configured to be adhesively bonded to the first end of the polymeric foam test specimen and a second end interface including a second plurality of side walls that define a second end cup that is configured to be adhesively bonded to the second end of the polymeric foam test specimen.

7. The tensile test fixture according to claim 6, wherein the first side wall includes a first end coupled to the first support surface and a second end, and the second side wall includes a first end section coupled to the first support surface and a second end section, the first end including a first flange that extends toward the second side wall and the second end section including a second flange extending toward the first side wall, the first flange and the second flange securing the first end interface in the first specimen end receiver.

8. The tensile test fixture according to claim 7, further comprising a first alignment member extending along one of the first flange and the second flange and between the first side wall and the second side wall, the first alignment member establishing an orientation of the first specimen end receiver relative to the first gripping member.

9. The tensile test fixture according to claim 8, further comprising an alignment fixture including a first member, a second member spaced from the first member, and a connecting member joining the first member and the second member, the first gripping member and the second gripping member being arranged between the first member and the second member, the alignment fixture orienting the first end interface relative to the second end interface.

10. The tensile test fixture according to claim 9, further comprising a first dowel and a second dowel extending through the first member and the second member adjacent the first end interface and a first dowel element and a second dowel element extending through the first member and the second member adjacent the second end interface, the dog bone region passing between the first dowel and the second dowel and the first dowel element and the second dowel element.

11. A method of supporting a polymeric foam test specimen having a first end, a second end opposite the first end, and a dog bone region extending between the first end and the second end in a tensile test fixture comprising:
positioning the first end of the polymeric foam test specimen in a first gripping member that does not exert a compressive force on the first end; and
positioning the first end of the polymeric foam test specimen in a second gripping member that does not exert a compressive force on the second end.

12. The method of claim 11, further comprising
bonding a first end interface to the first end of the polymeric foam test specimen; and
bonding a second end interface to the second end of the polymeric foam test specimen.

13. The method of claim 12, wherein bonding the first end of the polymeric foam test specimen to the first end interface and bonding the second end of the polymeric foam test specimen to the second end interface includes applying an amount of adhesive to one of the first end of the polymeric foam test specimen and the first end interface and one of the second end of the polymeric foam test specimen and the second end interface.

14. The method of claim 12, wherein positioning the first end of the polymeric foam test specimen in the first gripping member includes sliding the first end interface into a first specimen end receiver defined between a first support surface, a first side wall and a second side wall; and
wherein positioning the second end of the polymeric foam test specimen in the second gripping member includes sliding the second end interface into a second specimen end receiver defined between a second support surface, a first side wall portion, and a second side wall portion.

15. The method of claim 14, further comprising
restraining the first end of the polymeric foam test specimen in the first specimen end receiver between the first support surface and, a first flange extending from the first side wall and a second flange extending from the second side wall towards the first flange; and
restraining the second end of the polymeric foam test specimen in the second specimen end receiver between the second support surface and a first flange member extending from the first side wall portion and a second flange member extending from the second side wall portion toward the first flange member.

16. The method of claim 15,
wherein restraining the first end of the polymeric foam test specimen includes trapping the first end interface between the first support surface, the first flange, and the second flange; and
wherein restraining the second end of the polymeric foam test specimen includes trapping the second end interface between the second support surface, the first flange member, and the second flange member.

17. The method of claim 16, further comprising
aligning the first end of the polymeric foam test specimen relative to the first gripping member; and
aligning the second end of the polymeric foam test specimen relative to the second gripping member.

18. The method of claim 17,
wherein aligning the first end of the polymeric foam test specimen includes securing a first alignment member along one of the first flange and the second flange and between the first side wall and the second side wall; and
wherein aligning the second end of the polymeric foam test specimen includes securing a second alignment member along one of the first flange member and the second flange member between the first side wall portion and the second side wall portion.

19. The method of claim 17 further comprising aligning the first end of the polymeric foam test specimen in the first specimen end receiver relative to the second end of the polymeric foam test specimen in the second specimen end receiver.

20. The method of claim 19, wherein aligning the first end of the polymeric foam test specimen with the second end of the polymeric foam test specimen includes positioning the first end interface and the second end interface between a first member and a second member of an alignment fixture.

* * * * *